United States Patent [19]
Bender et al.

[11] 3,897,419
[45] July 29, 1975

[54] BASICALLY SUBSTITUTED COUMARIN DERIVATIVES

[75] Inventors: Heinz Bender, Bergen-Enkheim, Germany; Adolf Stachel, deceased, late of Frankfurt-Fechenheim, Germany; by Ingeburg Lydia Katharina Stachel, heiress, Offenbach, Germany; Rudi Beyerle, Bruchkobel, Germany; Rolf-Eberhard Nitz, Bergen-Enkheim, Germany; Josef Scholtholt, Frankfurt, Germany

[73] Assignee: Cassella Farbwerke Mainkur AG, Frankfurt am Main-Fechenheim, Germany

[22] Filed: Sept. 13, 1973

[21] Appl. No.: 397,145

[30] Foreign Application Priority Data
Sept. 28, 1972  Germany............................ 2247691

[52] U.S. Cl. ............. 260/240 J; 424/246; 424/248; 424/249; 424/250; 424/267; 424/274; 260/240 K
[51] Int. Cl.² ........................................ C07D 311/12
[58] Field of Search ...................... 260/240 J, 240 K

[56] References Cited
FOREIGN PATENTS OR APPLICATIONS
1,962,154  6/1971  Germany
1,135,907  12/1968  United Kingdom

*Primary Examiner*—Arthur P. Demers
*Attorney, Agent, or Firm*—Francis M. Crawford

[57] ABSTRACT

The present invention relates to new pharmacologically valuable, basically substituted derivatives of coumarin possessing specific cardiovasodilatory action and having the formula

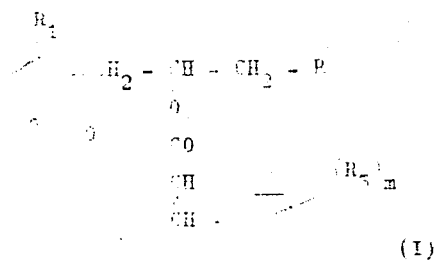

(I)

wherein R represents the radical of an aliphatic, cycloaliphatic, araliphatic or aromatic amine having 2 – 10 carbon atoms or the radical of a 5, 6 or 7 ring membered heterocyclic amine optionally containing an additional N, O or S hetero atom the radical being attached through the nitrogen atom, $R_1$ represents an alkyl radical having 1 – 4 carbon atoms or an aryl radical, $(R_2)_2$ represents two alkoxy groups containing 1 – 4 carbon atoms, attached to the coumarin residue in the 5,7-, 6,7-, or 7,8-positions, $R_3$ represents an alkoxy group containing 1 – 4 carbon atoms, and $m$ represents the integer 2 or 3.

The above derivatives are produced by acylating coumarin derivatives having the formula

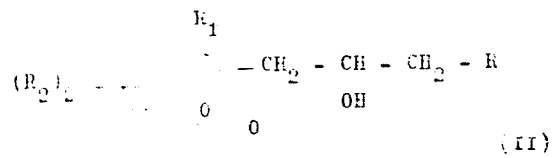

(II)

with an alkoxycinnamic acid having the formula

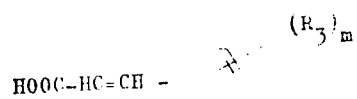

or a reactive derivative of the latter, optionally in the presence of an acid-binding agent, the radicals, R, $R_1$, $(R_2)_2$, $R_3$ and $m$ having the meanings set out above.

4 Claims, No Drawings

BASICALLY SUBSTITUTED COUMARIN DERIVATIVES

The present invention relates to new pharmacologically valuable, basically substituted derivatives of coumarin possessing specific cardiovasodilatory action and having the formula

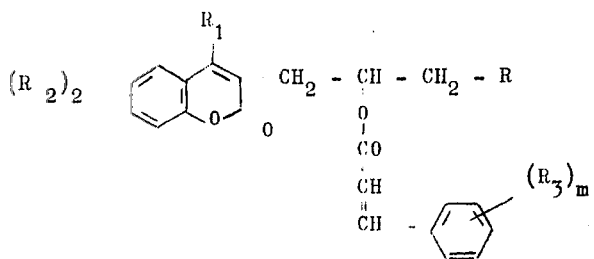

and pharmaceutically acceptable acid addition salts thereof, wherein

R represents the radical of an aliphatic, cycloaliphatic, araliphatic or aromatic amine having 2 – 10 carbon atoms, or the radical of a 5, 6 or 7 ring membered heterocyclic amine optionally containing an additional N, O, or S hetero atom, the radical being attached through the nitrogen atom, $R_1$ represents an alkyl radical having 1 – 4 carbon atoms, or an aryl radical;

$(R_2)_2$ represents two alkoxy groups containing 1 – 4 carbon atoms, attached to the coumarin residue in the 5,7-, 6,7-, or 7,8-positions, $R_3$ represents an alkoxy group containing 1 – 4 carbon atoms, and $m$ represents an integer selected from 2 and 3.

The amine radical R bound via a nitrogen atom may be derived from aliphatic mono- and diamines such as alkylamines, dialkylamines, alkenylamines, alkylenediamines, hydroxyalkylamines, alkoxyalkylamines, and acyloxyalkylamines, secondary amines being preferred.

Suitable amines include, for example: methylamine, ethylamine, propylamine, butylamine, dimethylamine, diethylamine, allylmethylamine, N,N-diethyl-N'-methyl-ethylene-diamine, N,N-diethyl-N'-methyl-1,3-propylene-diamine, N-methylethanolamine, N-methylpropanolamine, N-isopropyl-ethanolamine, N-butyl-ethanolamine or N-benzylethanolamine; the hydroxy groups of the abovementioned hydroxyalkylamines may be esterified with a carboxylic acid. Carboxylic acids which may be used for this purpose include, for example, formic acid, acetic acid, carbonic acid half-esters, and alkoxybenzoic acids.

Examples of suitable cycloaliphatic amines from which R may be derived include N-methyl-N-cyclopropylamine, and N-methyl-N-cyclohexylamine.

Examples of suitable araliphatic amines include phenalkyl-alkylamines, such as benzyl-methylamine, 3,4-dimethoxy-phenethyl-methylamine, 2,3,4-trimethoxy-phenethyl-methylamine, 3,4-dimethoxy-phenylisopropyl-methylamine, or 2,3,4-trimethoxy-phenylisopropyl-methylamine.

Examples of suitable aromatic amines from which R may be derived include: N-methylaniline, N-methyl-p-anisidine, N-methyl-3,4-dimethoxy-aniline, N-methyl-3,4,5-trimethoxyaniline, or N-methyl-p-chloroaniline.

Examples of suitable heterocyclic amines include pyrrolidine, morpholine, thiomorpholine, piperidine, N-methyl-piperazine, N-(β-hydroxyethyl)-piperazine, N-(γ-hydroxypropyl)-piperazine, N-(p-chloro-phenyl)-piperazine, N-(2,3,4-trimethoxy-benzyl)piperazine, N-(3,4-dimethoxybenzyl)-piperazine, N-(2,6-dimethylphenylcarbamoyl-methyl)-piperazine, N-(3,4,5-trimethoxy-phenyl-carbamoylmethyl)-piperazine or hexamethylenimine.

The coumarin derivatives according to the invention are obtained by acylating coumarin derivatives of the general formula

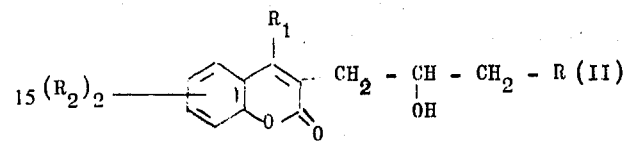

where R, $R_1$ and $(R_2)_2$ have the meanings given above, with an alkoxycinnamic acid of the general formula:

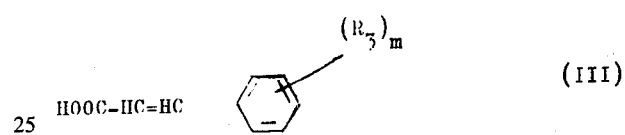

wherein $R_3$ and $m$ are defined as above, or a reactive derivative of the latter, optionally in the presence of an acid-binding agent.

Preferred acylating agents are the halides, and particularly the chlorides, of alkoxycinnamic acids. $(R_3)_m$ preferably represents 3 methoxy groups, which are preferably in the 3,4,5-positions.

The acylation is effected in an inert organic solvent, and examples of preferred acid-binding media are tertiary aliphatic amines, such as triethylamine and inorganic acid-binding salts, such as sodium or potassium carbonate.

The 3-γ-amino-β-hydroxy-propyl-coumarins required as starting compounds for the production of the compounds of the present invention can be produced by reacting the corresponding amines from which the radical R is derived with appropriately substituted 3-γ-halogen-β-hydroxy-propyl-coumarins or the corresponding 3-(2', 3'-epoxypropyl)-coumarins by known processes. Surprisingly, in the case of primary amines, the replacement of the halogen atom of 3-γ-halogen-β-hydroxy-propyl-coumarins by the amine radical takes place with good yields, without unwanted subsidiary reactions. The hydrogen atom of a secondary amino group which may be present can be replaced by alkyl or aralkyl radicals by subsequent alkylation.

The coumarin derivatives of the present invention and their pharmaceutically acceptable acid addition salts are valuable pharmaceuticals; they possess, for example, a specific cardiovasodilatory action and in this respect are superior to known substances, of this kind. The salts are colorless, crystalline substances, readily soluble in water. The compounds of the invention may be utilized in pharmaceutical preparations together with conventional pharmaceutically acceptable diluents or carriers.

Pharmacological investigation of the cardiovasodilatory action was carried out on narcotised dogs. The animals were narcotised with Chloralose-urethane-morphine, and the compounds being tested were administered intravenously. The coronary blood flow was measured by means of catheters by the method of LOCHNER and OSWALD (Pflugers Arch. ges. Physiol. 281, Band 3, Seite 305–308, 1964). The blood pressure in the femoral artery was measured with a Statham-strain-gauge electromanometer, and the pulse rate was measured from an electronic blood pressure recorder.

EXAMPLE 1

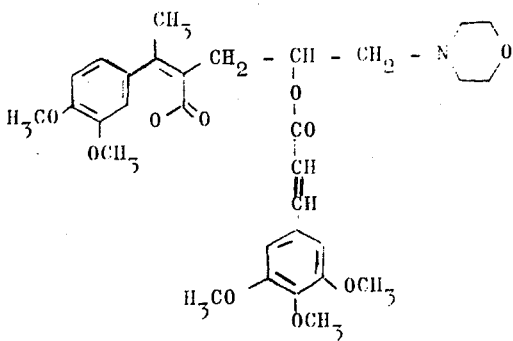

The results of the pharmacological investigations are summarized in the following table. The compounds were tested in the form of their hydrochlorides.

| Compound | Dosage mg/kg i.v. | Maximum increase in coronary blood flow % | in Min. | Maximum increase in blood pressure (systolic/diastolic) % | in Min. | Maximum increase in pulse rate % | in rate |
| --- | --- | --- | --- | --- | --- | --- | --- |
| 3-[γ-Morpholino-β-(3',4',5'-trimethoxy-cinnamoyloxy)-propyl]-4-methyl-7,8-dimethoxy-coumarin | 0.5 | +330 | 30 | −15/−19 | 30 | +7 | 30 |
| 3-[γ-Piperidino-β-(3',4',5'-trimethoxy-cinnamoyloxy)-propyl]-4-methyl-7,8-dimethoxy-coumarin | 0.1 | +230 | 10 | ±0/±0 | | +4 | 20 |
| 3-[γ-pyrrolidino-β-(3',4',5'-trimethoxy-cinnamoyloxy)-propyl-]-4-methyl-7,8-dimethoxy-coumarin | 0.1 | +200 | 10 | ±0/±0 | | ±0 | |
| 3-[γ-Hexamethyleneimino-β-(3',4',5'-trimethoxycinnamolyoxy-)-propyl]-4-methyl-7,8-dimethoxy-coumarin | 0.1 | +215 | 15 | ±0/±0 | | +12 | 4 |
| 3-[γ-Diethylamino-β-(3',4',5'-trimethoxycinnamoyloxy)-propyl]-4-methyl-7,8-dimethoxy-coumarin | 0.5 | +286 | 90 | −38/−33 | 90 | +15 | 30 |
| 3-[γ-Thiomorpholino-(3',4',5'-trimethoxycinnamoyloxy)-propyl/-4-methyl-7,8-dimethoxy-coumarin | 0.5 | +248 | 15 | −15/−15 | 10 | ±0 | |
| 3-[γ-Morpholino-β-(3',4',5'-trimethoxybenzoyloxy)-propyl]-4-methyl-7,8-dimethoxy-coumarin | 0.5 | +65 | 30 | −24/−40 | 10 | +15 | 30 |

(The latter compound is the control compound in accordance with Belgian Patent No. 727,054)

The compounds of the present invention may be utilized in pharmaceutical preparations together with a conventional pharmaceutically acceptable diluent or carrier. In the manufacture of dragees and tablets, the compounds of the invention can be mixed with known tabletting adjuvants such as starch, lactose or talc. Any pharmaceutically acceptable media for making tablets or dragees may be used. For the manufacture of injectable preparations, the hydrochlorides of the compounds are especially suitable, as they are for the most part readily soluble. Obviously, injectable preparations of water insoluble compounds can be prepared in known manner by the use of suspension media, emulsifiers and/or solvents.

The following examples will illustrate more specifically the compounds of the present invention and the methods of preparing same but it is to be understood that applicants are not limited to the specific conditions set forth therein other than as generally disclosed above.

56.3 g (0.1 mol) 3-(γ-morpholino-β-hydroxy-propyl)-4-methyl-7,8-dimethoxy-coumarin were dissolved in 300 ml anhydrous benzene and 10.1 g (0.1 mol) of trimethylamine were added. A solution of 25.6 g (0.1 mol) of 3,4,5-trimethoxycinnamic acid chloride in 100 ml of anhydrous benzene was then added drop by drop, with stirring and at room temperature, over a period of 30 minutes, and the mixture was then stirred for 2 hours at room temperature. It was then heated to boiling point under reflux for 5 hours, and then, while still hot, the precipitated triethylamine hydrochloride was filtered off under suction.

The filtrate was washed with water, 10% aqueous sodium bicarbonate solution, and again with water, and then dried over calcined sodium sulphate. The solvent was evaporated off in vacuo and the residue recrystallized from methanol. 3-[γ-morpholino-β-(3',4',5'-trimethoxy-cinnamoyloxy)-propyl]-4-methyl-7,8-dimethoxy-coumarin was thus obtained as colorless crystals, MP 168°–175°C. Yield: 52.6 g = 85% of theory. The hydrochloride had a melting point of 183°C.

EXAMPLE 2

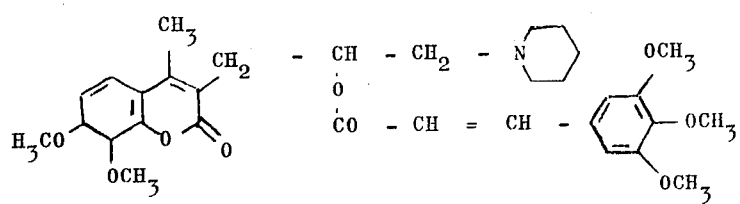

10.8 g (0.03 mol) of 2(-γ-piperidino-β-hydroxypropyl)-4-methyl-7,8-dimethoxy-coumarin and 3.3 g (0.033 mol) of triethylamine were dissolved in 70 ml of anhydroux dioxane, and mixed drop by drop with 8.6 g (0.033 mol) of trimethoxycinnamic acid chloride dissolved in 30 ml of anhydrous dioxane. The reaction mixture was stirred for 2 hours at room temperature and for 5 hours at 60°C. The precipitated triethylamine hydrochloride was then filtered off under suction while hot, the filtrate boiled down to dryness, the residue taken up in acetic ester, the acetic ester phase washed by shaking out with an aqueous solution of sodium carbonate and dried with potassium carbonate, and the solvent then evaporated in vacuo. By recrystallizing the residue from a little acetic acid or benzene, 3-[-γ-piperidino-β-(3',4',5'-trimethoxycinnamoyloxy)-propyl-]4-methyl-7,8-dimethoxycoumarin was obtained, having a melting point of 160°–162°C. Yield: 14 g = 80.4% of theory.

The following compounds were produced in a manner similar to that described in Examples 1 and 2:

3-[γ-pyrrolidino-β-(3',4',5'-trimethoxycinnamoyloxy)propyl]-4-methyl-7,8-dimethoxycoumarin. MP of base 150°–152°C.

3-[γ-hexamethyleneimino-β-(3',4',5'-trimethoxycinnamoyloxy)propyl]-4-methyl-7,8-dimethoxycoumarin. MP of base 123°–125°C.

3-[γ-diethylamino-β-(3',4',5'-trimethoxycinnamoyloxy)propyl]-4-methyl-7,8-dimethoxycoumarin. MP of base 138°–140°C.

3-[γ-thiomorpholino-β-(3',4',5'-trimethoxycinnamoyloxy)propyl]-4-methyl-7,8-dimethoxycoumarin. MP of base 165°–167°C.

What is claimed is:

1. Basically substituted coumarin derivatives having the formula

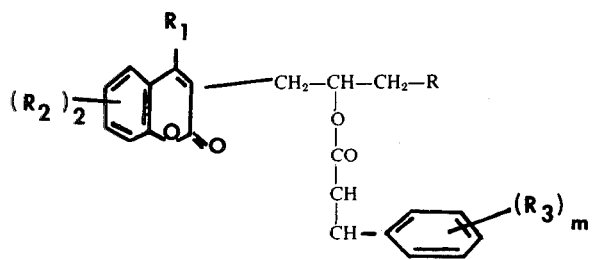

and pharmaceutically acceptable acid addition salts thereof wherein

R represents a radical derived from the group consisting of an alkylamine, dialkylamine, alkenylamine, alkylenediamine, hydroxyalkylamine, alkoxyalkylamine, acyloxyalkylamine, alkyl- cycloalkylamine, alkylphenalkylamine alkyl-alkoxyphenalkylamine, alkyl-alkoxyphenylamine, alkylphenylamine having 2 – 10 carbon atoms, pyrrolidine, morpholine, thiomorpholine, piperidine, N-methyl-piperazine, N-(β-hydroxyethyl)-piperazine, N-(γ-hydroxypropyl)-piperazine, N-(p-chloro-phenyl)-piperazine, N-(2,3,4-trimethoxybenzyl)-piperazine, N-(3,4-dimethoxy-benzyl)piperazine, N-(2,6-dimethylphenyl-carbamoylmethyl)-piperazine, N-(3,4,5-trimethoxy-phenyl-carbamoylmethyl)-piperazine and hexamethyleneimine, the radical being attached through the nitrogen atom, $R_1$ represents an alkyl radical having 1 – 4 carbon atoms, or an aryl radical, $(R_2)_2$ represents two alkoxy groups containing 1 – 4 carbon atoms, attached to the coumarin residue in the 5,7-, 6,7- or 7,8-positions, $R_3$ represents an alkoxy group containing 1 – 4 carbon atoms, and m represents an integer selected from 2 and 3.

2. Coumarin derivatives according to claim 1, wherein $(R_3)_m$ stands for 3,4,5-trimethoxy.

3. Coumarin derivatives according to claim 1, wherein R is a radical derived from methylamine, ethylamine, propylamine, butylamine, dimethylamine, diethylamine, allylmethylamine, N,N-diethyl-N'-methylethylene-diamine, N,N-diethyl-N'-methyl-1,3-propylene-diamine, N-methyl-ethanolamine, N-methyl-propanolamine, N-isopropyl-ethanolamine, N-butylethanolamine, N-benzylethanolamine, N-methyl-N-cyclopropylamine, N-methyl-N-cyclohexylamine, benzyl-methylamine, 3,4-dimethoxy-phenethylmethylamine, 2,3,4-trimethoxyphenethyl-methylamine, 3,4-dimethoxyphenylisopropyl-methylamine, 2,3,4-trimethoxyphenylisopropylmethylamine, N-methylaniline, N-methyl-p-anisidine, N-methyl-3,4-dimethoxy-aniline, N-methyl-3,4,5-trimethoxyaniline, and N-methyl-p-chloroaniline.

4. Coumarin derivatives according to claim 1 wherein R is derived from an amine selected from the group consisting of pyrrolidine, morpholine, thiomorpholine, piperidine, N-methyl-piperazine, N-(β-hydroxyethyl)-piperazine, N-(γ-hydroxypropyl)-piperazine, N-(p-chloro-phenyl)piperazine, N-(2,3,4-trimethoxy-benzyl)-piperazine, N-(3,4-dimethoxybenzyl)-piperazine, N-(2,6-dimethylphenyl-carbamoylmethyl)-piperazine, N(3,4,5-trimethoxy-phenyl-carbamoylmethyl)piperazine and hexamethyleneimine.

* * * * *